United States Patent
Lähdemäki et al.

[11] Patent Number: 6,052,575
[45] Date of Patent: Apr. 18, 2000

[54] SYSTEM FOR TRANSMITTING CHARGE INFORMATION TO A WIRELESS SUBSCRIBER VIA A FORWARDED SUPERVISORY SIGNAL

[75] Inventors: Heimo Lähdemäki, Pirkkala; Timo Kononen, Tyrnävä; Jussi Sarpola; Olli Liinamaa, both of Oulu, all of Finland

[73] Assignee: Nokia Telecommunications Oy, Espoo, Finland

[21] Appl. No.: 08/930,989
[22] PCT Filed: Apr. 12, 1996
[86] PCT No.: PCT/FI96/00204
  § 371 Date: Feb. 9, 1998
  § 102(e) Date: Feb. 9, 1998
[87] PCT Pub. No.: WO96/32822
  PCT Pub. Date: Oct. 17, 1996

[30] Foreign Application Priority Data

Apr. 13, 1995 [FI] Finland ................................. 951806

[51] Int. Cl.[7] ............................................. H04Q 7/00
[52] U.S. Cl. ........................... 455/407; 455/422; 455/550
[58] Field of Search ................................. 455/405, 406, 455/407, 408, 409, 422, 550; 379/143, 155, 229, 235

[56] References Cited

U.S. PATENT DOCUMENTS 4,640,986 2/1987 Yotsutani et al. .................... 455/407 X
5,046,085 9/1991 Godsey et al. ...................... 455/407 X
5,809,124 9/1998 Bayod ................................ 455/407 X

FOREIGN PATENT DOCUMENTS

| 135196 | 3/1985 | European Pat. Off. . |
| 95/20298 | 7/1995 | WIPO . |
| 96/03832 | 2/1996 | WIPO . |

*Primary Examiner*—Wellington Chin
*Assistant Examiner*—Philip J. Sobutka
*Attorney, Agent, or Firm*—Pillsbury Madison & Sutro

[57] ABSTRACT

The invention relates to a radio system realizing a wireless subscriber interface, the system including a subscriber station (1) which comprises means (8, TRX) for forwarding, on the radio path, a supervisory signal received on the radio path, a base station (5) which monitors the connection to the subscriber station by means of the supervisory signal, and a subscriber network element (6) for transmitting communication signals between a communication system (PSTN) and the subscriber station (1). In order to transmit charging information, the subscriber network element (6) comprises detecting means (9) for detecting a home metering pulse transmitted from the communication system (PSTN), whereby the control unit (11) is arranged to control the supervisory means (10, 14) for sending a charging signal to the subscriber station (5) by means of the supervisory signal in response to detecting the home metering pulse, and the subscriber station (1) comprises a detecting means (12) for detecting the charging signal, and a signal generator (13) responsive to the detecting means (12) for generating and feeding a home metering pulse to the user interface (2) in response to detecting the charging signal.

9 Claims, 2 Drawing Sheets

SYSTEM FOR TRANSMITTING CHARGE INFORMATION TO A WIRELESS SUBSCRIBER VIA A FORWARDED SUPERVISORY SIGNAL

This application is the national phase of international application PCT/FI96/00204, filed Apr. 12, 1996 which designated the U.S.

BACKGROUND OF THE INVENTION

1. Field of the Invention

The present invention relates to a radio system realizing a wireless subscriber interface, the system including a subscriber station which comprises means for forwarding, on the radio path, a supervisory signal received on the radio path, a base station which comprises supervisory means for producing and transmitting said supervisory signal on the radio path to the subscriber station and for monitoring the connection between the subscriber station and the base station on the basis of the supervisory signal returned by the subscriber station, and a subscriber network element which comprises means for forwarding, on the radio path, communication signals between a communication system and the subscriber station via the base station, and a control unit for controlling the supervisory means of the base station. The invention further relates to subscriber station in a radio system realizing a wireless subscriber interface, the subscriber station having a radio section and a user interface, whereby the radio section comprises means for establishing, by means of radio frequency signals, a communication link between the user interface and a communication system, the subscriber station having means for forwarding, on the radio path, a predetermined supervisory signal received on the radio path.

The present invention particularly relates to forwarding, by means of radio signals, charging information to a chargeable subscriber station, such as a coin box telephone, which communicates with the communication network. The invention particularly relates to a Wireless Local Loop (WLL) system, i.e. a radio system constituting a wireless local loop wherein subscriber stations are connected to the public switched telephone network (PSTN) by a radio connection. Any conventional telephone set can be connected to the WLL system with a specific terminal equipment, resulting in that the radio path is transparent as far as the user is concerned.

2. Description of the Related Art

The term subscriber station here refers to the equipment which the subscriber has at his disposal for transmitting and receiving communication signals, i.e. in case of a WLL system, the subscriber station includes a WLL terminal consisting of a radio section and a tele adapter (to which the user interface, such as a telephone, is connected), as well as a user interface such as a telephone, telefax, computer/modem combination or the like to be connected to the terminal equipment. The term chargeable subscriber station here refers to a type of a subscriber station that charges the user immediately in connection with the use, and most often at least partly in advance. The chargeable subscriber stations denote subscriber stations that comprise user interfaces operating with coins, credit cards or similar methods of payment, i.e. interfaces such as coin box telephones or telefax terminals.

In connection with the use of chargeable subscriber stations, the system must be able to charge the user of the subscriber station during the use. The fixed telephone network commonly employs 12 kHz or 16 kHz home metering pulses to transmit charging information. As the width of the speech band in radio systems is, for practical reasons, significantly narrower than the width of the speech band in the fixed telephone network, the aforementioned frequencies do not usually fall within the speech band of radio systems. Therefore, the home metering pulses have to be sent to the subscriber stations of the radio system on some other frequency.

A prior art solution is utilized in association with chargeable subscriber stations in, for example, the NMT system, wherein a tariff frame is transmitted on the radio path to a coin box telephone in connection with call set-up. On the basis of the tariff frame, the phone charges its user independently for the duration of the entire call. A drawback of this prior art solution is that it cannot take into account tariff changes possibly taking place during the call. It is common practice that the operator defines a separate evening tariff, which may differ considerably from the day-time tariff. However, the aforementioned prior art solution is not able to take into account that the tariff may change during a call with the result that the user of a coin box telephone ends up paying significantly more (or less) for the call than the operator considers the true charge of the call to be. In other words, the charge determined by the exchange for the call may differ considerably from the sum charged by the coin box telephone from the user. The above also presents a disadvantage for conventional phones if a pulse counter has been connected to the phone. The reading on the counter may in such a case differ from the reading determined by the exchange and used for charging the subscriber.

SUMMARY OF THE INVENTION

It is an object of the present invention to solve the aforementioned problem and to provide a solution for transmitting charging information to a chargeable subscriber station by interfering the ongoing communication connection as little as possible, but so that the number of home metering pulses transmitted to the user interface of the subscriber station corresponds precisely with the number of home metering pulses transmitted from the fixed network. This object is achieved with the radio system of the invention, which is characterized by the subscriber network element comprising detecting means for detecting a home metering pulse transmitted from the communication system, whereby the control unit is arranged to control the supervisory means for sending a charging signal to the subscriber station by means of the supervisory signal in response to detecting the home metering pulse, and the subscriber station comprising detecting means for detecting the charging signal transmitted by means of the supervisory signal, and a signal generator responsive to the detecting means for generating and feeding a home metering pulse to the user interface in response to detecting the charging signal.

The invention is based on the idea that as the charging information is transmitted from a subscriber network element to a subscriber station by means of a supervisory signal which is intended for monitoring the quality of the communication connection between them, the home metering pulses can be transmitted to the user interface of the subscriber station in real time, i.e. immediately after receiving them at the subscriber network element, without this causing interference to the ongoing communication connection and without the transmitting of the charging information requiring a separate signalling channel. Thus, the most significant advantages of the system according to the invention are that the number of home metering pulses transmitted to the user interface at all times exactly correspond to the number of home metering pulses transmitted from the fixed network, that the charging information is transmitted to the user interface of the subscriber station in a similar form as in the fixed network whereby the system may employ the fixed network user interfaces, such as coin box telephones, that a separate signalling channel is not required for transmitting home metering pulses, and that the transmitting of home metering pulses in no way interferes with an ongoing communication connection.

The present invention further relates to a subscriber station that is applicable in a system according to the invention. The subscriber station of the invention is characterized by comprising a detecting means for detecting a charging signal transmitted by means of the supervisory signal, and a signal generator responsive to the detecting means for generating a home metering pulse and feeding it to the user interface in response to detecting the charging signal.

The preferred embodiments of the radio system and subscriber station according to the invention are disclosed in the attached dependent claims 2–4 and 6–9. In the following, the invention will be described in greater detail by means of a preferred embodiment of the invention with reference to the accompanying drawings, in which

DETAILED DESCRIPTION OF THE INVENTION

Figure 1:
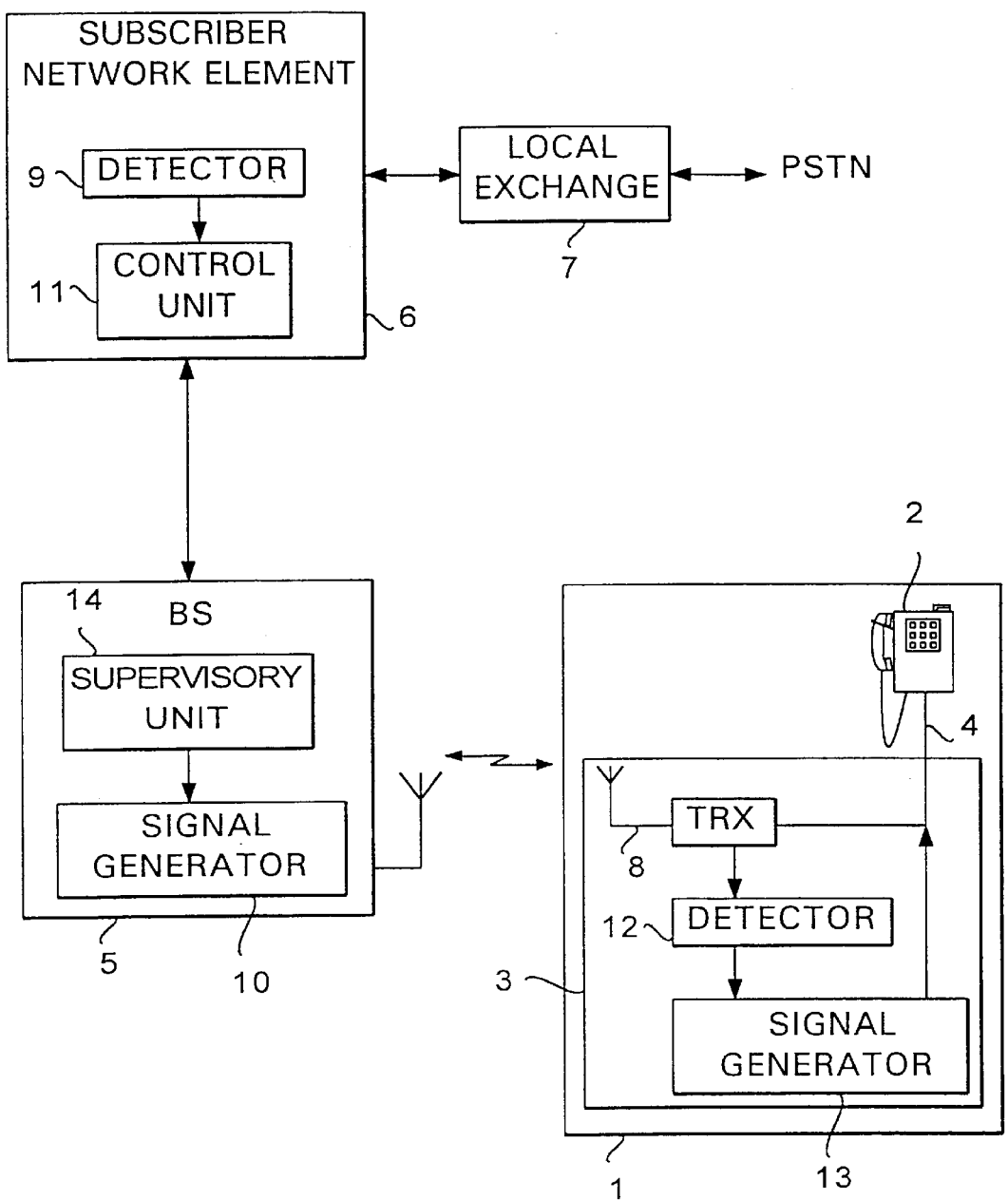
FIG. 1 is a block diagram illustrating the first preferred embodiment of a radio system according to the invention.

FIG. 1 is a block diagram illustrating the first preferred embodiment of a radio system according to the invention. The block diagram in FIG. 1 shows a WLL system which is based on the NMT-900 system (Nordisk Mobil Telefon) and in which the radio connection and signalling between a subscriber network element 6 and a subscriber station substantially correspond with the NMT-900 system. Therefore, if desired, a mobile phone of the NMT-900 system may be employed as a subscriber station in the system. FIG. 1, however, shows a chargeable subscriber station 1 of the WLL system, the station comprising a coin box telephone 2, i.e. a coin-operated telephone, and a terminal equipment 3.

The coin box telephone 2 in FIG. 1 is a coinoperated telephone which can be connected to the public switched telephone network by an ordinary double conductor, and which operates with 12 kHz and 16 kHz home metering pulses. Instead of a coin-operated telephone, any user interface of the fixed telephone network can be connected to the terminal equipment 3, for example a conventional phone or telefax terminal, making it possible to arrange a conventional fixed network pulse counter in connection with the user interface to count the home metering pulses.

In FIG. 1, the coin box telephone 2 and the terminal equipment 3 are interconnected by a double conductor 4 on which communication signals can be transmitted between the terminal equipment and the phone. The terminal equipment 3 comprises signal processing means for adapting the speech path to the radio channel. Such signal processing means include, for example, a radio section TRX which contains an antenna 8, a radio transmitter and a radio receiver, and a tele adapter which adapts the radio section to the conventional telephone 2.

By means of the antenna 8, the subscriber station 1 communicates on the radio path frequency signals with a base station 5 through which calls are forwarded via a subscriber network element 6 to a local exchange 7 of the PSTN network (Public Switched Telephone Network), i.e the fixed network. The base stations 5 correspond with the elements of the NMT-900 cellular radio system. As far as signalling is concerned, the subscriber station 1 operates just as an ordinary mobile phone of the NMT-900 system.

The base station 5 monitors the communication connection between itself and the subscriber station 1 by measuring signal to noise ratio on the radio path by means of a $\phi$ signal (fii) specified in the NMT-900 specifications. For this purpose, the signal generator 10 of the base station 5 inserts, controlled by a control unit 14, a continuous tone onto the speech channel, the tone being of 3955, 3985, 4015 or 4045 Hz depending on the frequency the control unit 11 in the subscriber network element 6 has determined to be used. The radio section TRX in the terminal equipment 3 of the subscriber station 1 is arranged to loop said $\phi$ signal back to the base station 5. If the control unit 14 of the base station 5 detects that the signal to noise ratio of the $\phi$ signal transmitted from the subscriber station is not in accordance with predetermined threshold values, it sends a message/alarm concerning this to the control unit 11 of a base station controller. In the NMT-900 system, the $\phi$ signal is utilized, among other things, for determining a correct time for a handover. The $\phi$ signal and its use are described in greater detail, for example, in:

NMT-900 specifications, Part 1, section 4.5 (Automatic Cellular Mobile Telephone System/Nordic NMT-900/System description, 1985), and NMT-900 specifications, Part 4, section 8.1.5, (1984).

According to the invention, $\phi$ signalling is used for forwarding home metering pulses transmitted from the fixed telephone network PSTN so that as a detector 9 of the subscriber network element 6 detects a home metering pulse transmitted from the fixed telephone network PSTN, the control unit 11 controls the control unit 14 of the base station 5 to discontinue transmitting the $\phi$ signal to the subscriber station for a predetermined time period. A detector 12 in the terminal equipment of the subscriber station 5 detects the break in the $\phi$ signal, whereby a signal generator 13 is activated to feed an ordinary 12 kHz or 16 kHz home metering pulse, utilized in the fixed network, to the user interface 2 by means of the double conductor 4.

Figure 2:
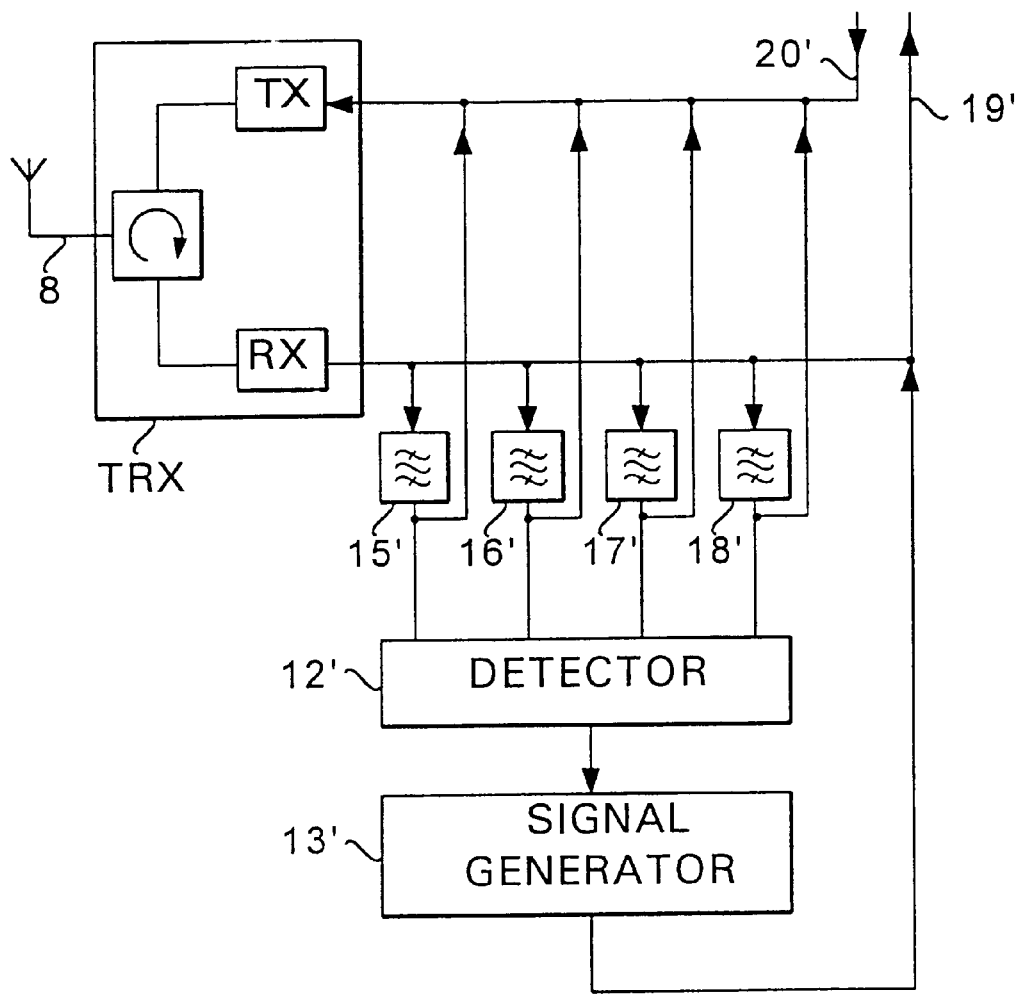
FIG. 2 is a block diagram illustrating a preferred embodiment of a subscriber station according to the invention.

FIG. 2 is a block diagram illustration of a preferred embodiment of a subscriber station according to the invention. In contrast to FIG. 1, the subscriber station of FIG. 2 is intended to be used in a system in which the base station 5 alters the frequency of the $\phi$ signal for transmitting a charging signal to a subscriber station. (i.e. does not discontinue feeding a $\phi$ signal as in FIG. 1).

As the detector of the subscriber network element detects a home metering pulse transmitted from the fixed network, its control unit orders the supervisory unit of the base station to change the frequency of the $\phi$ signal to some other available frequency. This means that if, for example, the frequency of 3955 Hz was in use, the control unit may control the supervisory unit of the base station to use the frequency of 3985 Hz from that moment on for transmitting the $\phi$ signal. According to the invention, the subscriber station will interpret this frequency change as a charging signal.

For the above purpose, four passband filters 15', 16', 17' and 18' are coupled to the receiver RX output of the subscriber station in FIG. 2, the filters having the passband frequencies of 3955, 3985, 4015, and 4045 Hz, respectively. The outputs of the passband filters are coupled to the inputs of a detector 12' as well as to the interface 20' between the user interface and the transmitter TX in order to forward the φ signal from the receiver to the transmitter. As the base station thus changes the frequency of the φ signal from 3955 to 3985 Hz, the detector detects this so that the φ signal is no longer fed to its first input to which the filter 15' is coupled, but to its second input to which the filter 16' is coupled. This means that the detector 12' activates the signal generator 13' to produce and feed a home metering pulse to the user interface by means of the interface 19'.

It should be understood that the description above and the associated figures are only intended to illustrate the present invention. Different kinds of modifications and variations of the invention will be obvious for a person skilled in the art without departing from the scope and spirit of the invention disclosed in the attached claims.

We claim:

1. A radio system realizing a wireless subscriber interface, the system including
    a subscriber station which comprises means for forwarding, on the radio path, a supervisory signal received on the radio path,
    a base station which comprises supervisory means for producing and transmitting said supervisory signal on the radio path to the subscriber station and for monitoring the connection between the subscriber station and the base station on the basis of the supervisory signal returned by the subscriber station, and
    a subscriber network element which comprises means for forwarding, on the radio path, communication signals between a communication system (PSTN) and the subscriber station via the base station, and a control unit for controlling the supervisory means of the base station, characterized by
    the subscriber network element comprising detecting means for detecting a home metering pulse transmitted from the communication system (PSTN), whereby the control unit is arranged to control the supervisory means for sending a charging signal to the subscriber station by means of the supervisory signal in response to detecting the home metering pulse, and
    the subscriber station comprising detecting means for detecting the charging signal transmitted by means of the supervisory signal, and a signal generator responsive to the detecting means for generating and feeding a home metering pulse to the user interface in response to detecting the charging signal.

2. A system as claimed in claim 1, characterized in that the control unit is arranged to control the supervisory means to discontinue transmitting the supervisory signal on the speech channel for a predetermined time period in response to detecting a home metering pulse.

3. A system as claimed in claim 1, characterized in that the control unit is arranged to control the supervisory unit for changing the frequency of the supervisory signal being transmitted on the speech channel in response to detecting a home metering pulse.

4. A system as claimed in claim 1, characterized in that said radio system is based on the NMT-450 or NMT-900 cellular radio system, whereby said subscriber stations can be subscriber stations of the NMT-450 or NMT-900 systems.

5. A subscriber station in a radio system realizing a wireless subscriber interface, the subscriber station having a radio section and a user interface, whereby the radio section comprises means for establishing, by means of radio frequency signals, a communication link between the user interface and a communication system, the subscriber station having means for forwarding, on the radio path, a predetermined supervisory signal received on the radio path, characterized by
    the subscriber station comprising a detecting means for detecting a charging signal transmitted by means of the supervisory signal, and
    a signal generator responsive to the detecting means for generating a home metering pulse and feeding it to the user interface in response to detecting the charging signal.

6. A subscriber station as claimed in claim 5, characterized in that the detecting means is arranged to detect an interruption of predetermined duration in the reception of the supervisory signal being transmitted on the speech channel.

7. A subscriber station as claimed in claim 5, characterized in that the detecting means is arranged to detect a frequency change of the supervisory signal being transmitted on the speech channel.

8. A subscriber station as claimed in claim 5, characterized in that said radio section corresponds to the radio section in a subscriber station of the NMT-450 or NMT-900 systems.

9. A subscriber station as claimed in claim 5, characterized in that the detecting means is arranged to detect a charging signal transmitted by means of the supervisory signal formed of a φ signal in accordance with the NMT specifications.

* * * * *